US010538389B2

(12) United States Patent
Iwata

(10) Patent No.: US 10,538,389 B2
(45) Date of Patent: Jan. 21, 2020

(54) CONVEYANCE FACILITY

(71) Applicant: DAIFUKU CO., LTD., Osaka-shi, Osaka (JP)

(72) Inventor: Masashige Iwata, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 16/268,588

(22) Filed: Feb. 6, 2019

(65) Prior Publication Data

US 2019/0248589 A1 Aug. 15, 2019

(30) Foreign Application Priority Data

Feb. 9, 2018 (JP) .................................. 2018-021488

(51) Int. Cl.
*B65G 9/00* (2006.01)
*B65G 19/02* (2006.01)
*B61B 10/02* (2006.01)

(52) U.S. Cl.
CPC ............ *B65G 9/008* (2013.01); *B61B 10/025* (2013.01); *B65G 19/025* (2013.01); *B65G 2201/02* (2013.01); *B65G 2812/188* (2013.01)

(58) Field of Classification Search
CPC ...... B65G 9/008; B65G 17/20; B65G 19/025; B65G 47/61; B65G 2201/02; B65G 2201/0229; B65G 2812/188; B61B 10/02; B61B 10/025
See application file for complete search history.

(56) References Cited

U.S. PATENT DOCUMENTS

| 3,474,738 A * | 10/1969 | Di Rosa | E01B 25/26 104/130.07 |
| 3,602,148 A * | 8/1971 | Swartz | B61B 10/025 104/96 |
| 3,908,555 A * | 9/1975 | Henderson | B61B 10/02 104/96 |
| 5,404,992 A | 4/1995 | Robu et al. | |
| 5,697,301 A * | 12/1997 | Sporer | B65G 19/025 104/163 |

(Continued)

FOREIGN PATENT DOCUMENTS

| DE | 29511555 U1 | 10/1995 |
| DE | 29709547 U1 | 8/1997 |

(Continued)

OTHER PUBLICATIONS

Extended European Search Report from corresponding EP 19155860.0, dated Jul. 5, 2019.

*Primary Examiner* — Gene O Crawford
*Assistant Examiner* — Keith R Campbell
(74) *Attorney, Agent, or Firm* — Kusner & Jaffe

(57) ABSTRACT

A conveyance facility for conveying a bag includes: a carrier including a traveling wheel, and a support supporting the bag being suspended, the carrier conveying the bag; and a traveling rail supporting the traveling wheel so as to be travelable. The traveling rail forms a first path, and a detour path branching from a location in the middle of the first path. A branch unit for switching a conveyance path of the carrier from the first path to the detour path is provided at a branch portion between the first path and the detour path. The branch unit is capable of directing the support from the first path to the detour path.

7 Claims, 11 Drawing Sheets

(56) References Cited

U.S. PATENT DOCUMENTS

| | | | |
|---|---|---|---|
| 5,768,998 A * | 6/1998 | Enderlein | B61B 10/02 |
| | | | 104/103 |
| 6,354,224 B1 * | 3/2002 | Devnani | B61L 23/005 |
| | | | 104/102 |
| 10,023,386 B2 * | 7/2018 | Otto | B65G 9/008 |
| 2004/0045793 A1 | 3/2004 | Schonenberger | |
| 2004/0107862 A1 | 6/2004 | Suh | |

FOREIGN PATENT DOCUMENTS

| | | |
|---|---|---|
| DE | 19943141 A1 | 3/2001 |
| DE | 10012524 A1 | 9/2001 |
| EP | 2117972 B1 | 6/2011 |
| WO | WO 03/037760 A1 | 5/2003 |
| WO | WO 2008/098781 A1 | 8/2008 |

\* cited by examiner

CONVEYANCE FACILITY

FIELD OF THE INVENTION

The present invention relates to a conveyance facility for conveying articles along a conveyance path, in particular to a conveyance facility for suspended conveyance of the articles.

BACKGROUND OF THE INVENTION

A conventional conveyance facility for suspended conveyance of articles is shown in European Patent No. 2117972. The conveyance facility shown in European Patent No. 2117972 includes a first conveyance lane causing carriers (conveyance unit) for the suspended conveyance of the articles, to travel along a conveyance path; and a branch conveyance lane and a second conveyance lane provided so as to branch from the first conveyance lane and causing the carriers to travel along the conveyance path. The first conveyance lane, the branch conveyance lane, and the second conveyance lane include a first guide rail, a branch guide rail, and a second guide rail, respectively. The first guide rail, the branch guide rail, and the second guide rail engage with a traveling roller (traveling body) of each of the carriers to cause the carrier to travel.

In the conveyance facility shown in European Patent No. 2117972, a switching device is provided at a branch portion between the first conveyance lane and the branch conveyance lane. The switching device switches the carrier from the first guide rail to the branch guide rail.

The switching device includes a guide band material for causing the carrier to travel along the first conveyance lane (first guide rail); and a diverter switch blade for causing the carrier to travel along the branch conveyance lane (branch guide rail). The switching device causes either one of the guide band material or the diverter switch blade to engage with the carrier. The switching device thereby causes the carrier to travel along the first guide rail or the branch guide rail.

However, in the conveyance facility shown in European Patent No. 2117972, if the carrier (conveyance unit) is caused to travel along the branch conveyance lane, the traveling roller (traveling body) of the carrier is engaged with the diverter switch blade of the switching device so as to direct the carrier to the branch guide rail. Accordingly, if the carrier bounces up or travels at high speed, the traveling roller is not sufficiently engaged with the diverter switch blade due to the traveling roller running off or the like. Consequently, the carrier is not reliably directed to the branch guide rail.

SUMMARY OF THE INVENTION

An object of the present invention is to provide a conveyance facility capable of reliably switching the conveyance path of the conveyance unit at the branch portion between a first conveyance path of the conveyance unit and a second conveyance path branching from a location in the middle of the first conveyance path.

Problems to be solved by the present invention have been described. Solutions to the problems will be described next.

In other words, a conveyance facility of the present invention is a conveyance facility for conveying an article along a conveyance path, including: a conveyance unit including a traveling body traveling on the conveyance path, and a support traveling with the traveling body and supporting the article being suspended, the conveyance unit conveying the article along the conveyance path; and a traveling rail supporting the traveling body so as to be travelable, wherein the traveling rail forms a first conveyance path, and a second conveyance path branching from a location in the middle of the first conveyance path, wherein a switching device for switching the conveyance path of the conveyance unit from the first conveyance path to the second conveyance path is provided at a branch portion between the first conveyance path and the second conveyance path, and wherein the switching device is capable of directing the support from the first conveyance path to the second conveyance path.

In the aforementioned configuration, in the conveyance unit, the conveyance path of the support is switched from the first conveyance path to the second conveyance path, by the switching device.

Furthermore, the switching device includes a guide member guiding the support in a predetermined direction; and the direction of guiding the support by the guide member is switchable by the switching device so as to be capable of directing the support from the first conveyance path to the second conveyance path.

In the aforementioned configuration, in the conveyance unit, the conveyance path is switched from the first conveyance path to the second conveyance path by switching the direction of guiding the support by the guide member.

Furthermore, the traveling rail includes a first guide rail guiding an upper portion of the support along the first conveyance path, and a second guide rail guiding the upper portion of the support along the second conveyance path; and the guide member supports and guides the upper portion of the support, and is capable of switching the direction of guiding the support, from the first guide rail to the second guide rail.

In the aforementioned configuration, in the conveyance unit, the conveyance path is switched from the first conveyance path to the second conveyance path by switching the direction of guiding by the guide member supporting and guiding the upper portion of the support.

Furthermore, the switching device includes a towing portion towing the guide member; and the guide member is capable of switching a traveling direction of the support, through the towing by the towing portion.

In the aforementioned configuration, the towing portion tows the guide member. Thereby, the direction of guiding the support by the guide member is switched from a direction of guiding the support toward the first conveyance path, to a direction of guiding the support toward the second conveyance path. In addition, a traveling path of the conveyance unit is switched from the first conveyance path to the second conveyance path.

According to the conveyance facility of the present invention, the switching device for switching the conveyance path of the conveyance unit can direct the support of the conveyance unit from the first conveyance path to the second conveyance path. Thereby, the conveyance unit can be caused to travel from the first conveyance path toward the second conveyance path while the support of the conveyance unit is directed from the first conveyance path to the second conveyance path by the switching device. Accordingly, when the entire conveyance unit travels from the first conveyance path toward the second conveyance path, the conveyance path of the conveyance unit can be reliably switched at the branch portion without bouncing up of the conveyance unit or the like.

DESCRIPTION OF THE INVENTION

A conveyance facility 10 according to the present invention will be described. The present invention is not limited to the conveyance facility 10 to be shown below.

Figure 1:
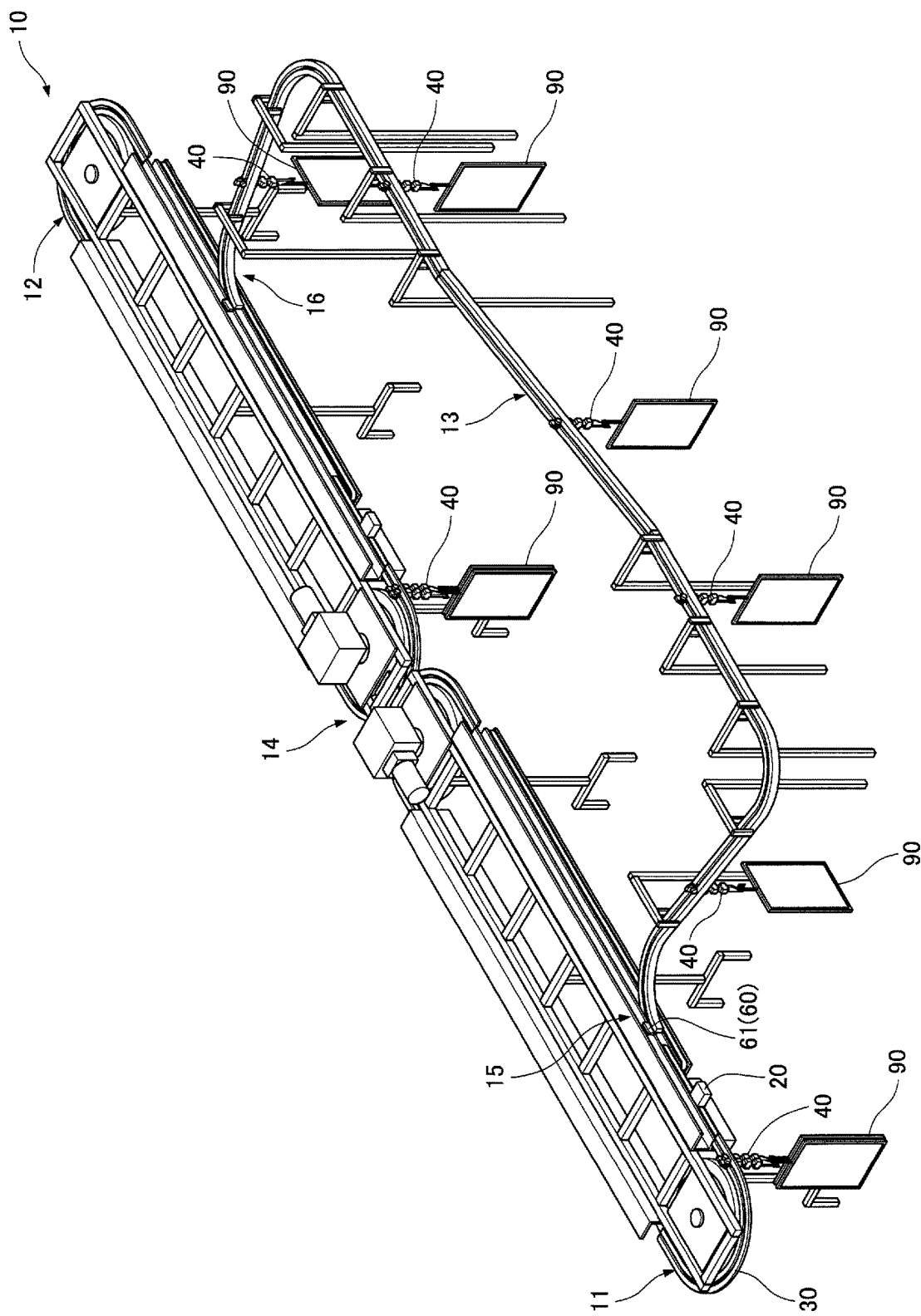
FIG. 1 is a general perspective view of a conveyance facility according to the present invention.

As shown in FIG. 1, the conveyance facility 10 is a suspended conveyance facility for suspended conveyance of bags 90 (an example of "article") containing goods. The conveyance facility 10 includes a first path 11 (an example of "conveyance path" and "first conveyance path") and a second path 12 (an example of "conveyance path") for circularly conveying the bags 90, as well as a detour path 13 (an example of "conveyance path" and "second conveyance path") branching from a location in the middle of the first path 11 and joining the second path 12.

The first path 11 and the second path 12 include loop-like conveyance paths. The first path 11 and the second path 12 have swivel paths on both end portions, respectively. The first path 11 and the second path 12 are serially arranged so that the swivel paths on the respective ones of the end portions face each other. A branch portion 14 is provided at a joint section between the first path 11 and the second path 12 (a portion where the swivel paths face each other).

The branch portion 14 keeps the bags 90 being circularly conveyed on the first path 11 so as to be circularly conveyed on the first path 11. Alternatively, the branch portion 14 causes the bags 90 being circularly conveyed on the first path 11 to be conveyed on the second path 12 through intersection of the branch portion 14. The branch portion 14 keeps the bags 90 being circularly conveyed on the second path 12 so as to be circularly conveyed on the second path 12. Alternatively, the branch portion 14 causes the bags 90 being circularly conveyed on the second path 12 to be conveyed on the first path 11 through the intersection of the branch portion 14.

The detour path 13 is a conveyance path for causing the bags 90 conveyed on the first path 11 to detour without the branch portion 14 so as to join the second path 12. A beginning portion of the detour path 13 branches at a location in the middle of the first path 11. An ending portion of the detour path 13 joins the second path 12.

A branch portion 15 is provided at the beginning portion of the detour path 13 (a connecting portion between the detour path 13 and the first path 11). The branch portion 15 is a portion where the detour path 13 branches from a location in the middle of the first path 11. The branch portion 15 keeps the bags 90 conveyed on the first path 11 so as to be conveyed on the first path 11. Alternatively, the branch portion 15 causes some of the bags 90 conveyed on the first path 11 to branch from the first path 11 to the detour path 13 for conveyance. The branch portion 15 will be described later.

A joint portion 16 is provided at the ending portion of the detour path 13 (a connecting portion between the detour path 13 and the second path 12). The joint portion 16 is a portion where the detour path 13 joins the second path 12. The joint portion 16 keeps the bags 90 conveyed on the second path 12 so as to be conveyed on the second path 12. Alternatively, the joint portion 16 causes the bags 90 conveyed on the detour path 13 to join the second path 12.

Figure 2A:
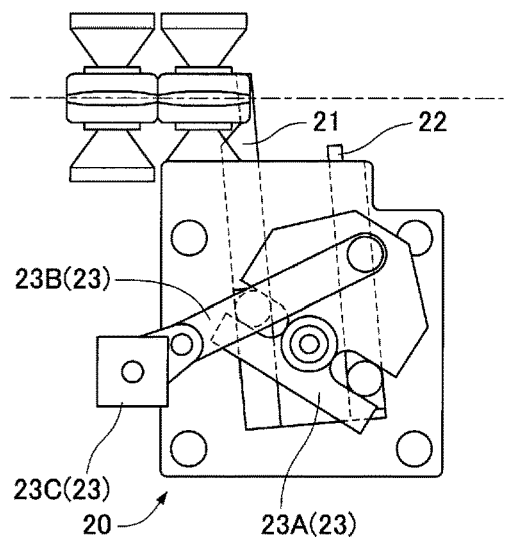
FIG. 2A is a plan view showing an outline of operations of a sending device of the same conveyance facility in a case where a first stopper is moved forward.
Figure 2B:
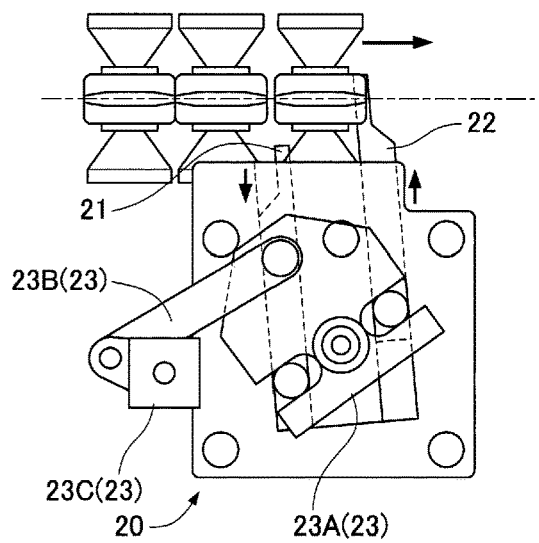
FIG. 2B is a plan view showing the outline of the operations of the sending device of the same conveyance facility in a case where the first stopper is moved backward and a second stopper is moved forward.
Figure 2C:
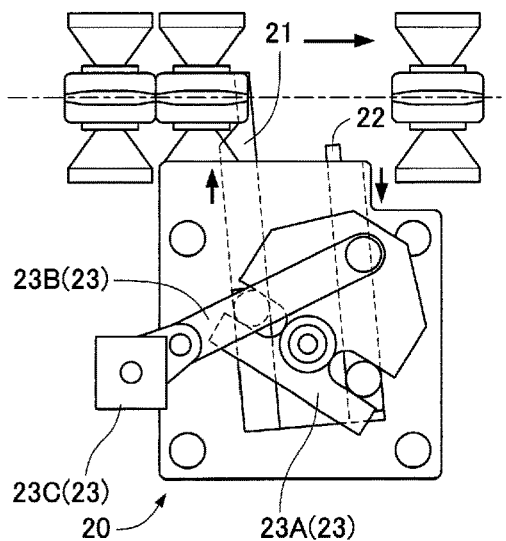
FIG. 2C is a plan view showing the outline of the operations of the sending device of the same conveyance facility in a case where the second stopper is moved backward and the first stopper is moved forward.

On the first path 11, a sending device 20 is provided on an upstream side of the branch portion 15. The sending device 20 is a device for sending out multiple carriers 40 (an example of "conveyance unit") traveling with the bags 90 being suspended, at predetermined intervals. The sending device 20 causes the multiple carriers 40 continuously traveling toward the branch portion 15 to stop once, and causes the adjacent carriers 40 to sequentially travel at the predetermined intervals. As shown in FIGS. 2A to 2C, the sending device 20 includes a first stopper 21 and a second stopper 22 for stopping the carriers 40, and a cam mechanism 23 for moving the first stopper 21 and the second stopper 22.

The first stopper 21 and the second stopper 22 are lengthy members extended orthogonally to a horizontal direction, with respect to a traveling direction of the carriers 40 traveling in the horizontal direction. The first stopper 21 and the second stopper 22 are driven by the cam mechanism 23 so as to move outward and backward with respect to the horizontal direction. Tip end portions of the first stopper 21 and the second stopper 22 move forward with respect to the horizontal direction so as to abut a front surface of each of the carriers 40 in the traveling direction to stop the carrier 40. The tip end portions of the first stopper 21 and the second stopper 22 move backward with respect to the horizontal direction so as to cancel the stop of the carrier 40 caused by the tip end portions. The first stopper 21 is arranged closer to an upstream side of the sending device 20 than the second stopper 22.

The cam mechanism 23 includes a cam body 23A causing the first stopper 21 and the second stopper 22 to alternately move outward and backward, an arm 23B swinging the cam body 23A, and a drive motor 23C driving the arm 23B. The cam mechanism 23 drives the drive motor 23C to operate the arm 23B so as to swing the cam body 23A. The first stopper 21 and the second stopper 22 thereby alternately move outward and backward with respect to the horizontal direction.

The sending device 20 causes the first stopper 21 and the second stopper 22 to alternately move outward and backward, and shifts timings of the carriers 40 passing through the sending device 20, so as to have the predetermined intervals between the adjacent carriers 40. Specifically, as shown in FIG. 2A, the tip end portion of the first stopper 21 abuts the front surface of the carrier 40 traveling from the upstream side of the sending device 20, in the traveling direction. The carrier 40 traveling from the upstream side of the sending device 20 is thereby stopped by the first stopper 21. As shown in FIG. 2B, the cam mechanism 23 is driven to cause the first stopper 21 to move backward and also cause the second stopper 22 to move forward. The carrier 40 stopped by the first stopper 21 thereby travels to a downstream side, and is stopped again by the second stopper 22. As shown in FIG. 2C, at a timing of a subsequent carrier 40 arriving at the first stopper 21, the cam mechanism 23 is driven to cause the first stopper 21 to move forward and also cause the second stopper 22 to move backward. The carrier 40 stopped by the second stopper 22 thereby travels to the downstream side, and the subsequent carrier 40 is stopped by the first stopper 21. In this way, the alternate movement of the first stopper 21 and the second stopper 22 causes only one carrier 40 to pass between the first stopper 21 and the second stopper 22. The adjacent carriers 40 (bags 90) thereby travel at the predetermined intervals.

As shown in FIGS. 1, 3, 4A and 4B, a branch unit 60 (an example of "switching device") is provided at the branch portion 15 of the first path 11. The branch unit 60 is a device for switching the conveyance path of the bags 90 conveyed on the first path 11, to the detour path 13. The branch unit 60 includes a branch device 61 for switching the traveling path of the carriers 40. The branch unit 60 actuates the branch device 61 to direct the carriers 40 traveling on the first path 11, to the detour path 13. The conveyance path of the bags 90 (carriers 40) conveyed from the first path 11 is thereby switched to the detour path 13. The branch unit 60 will be described later.

Figure 5:
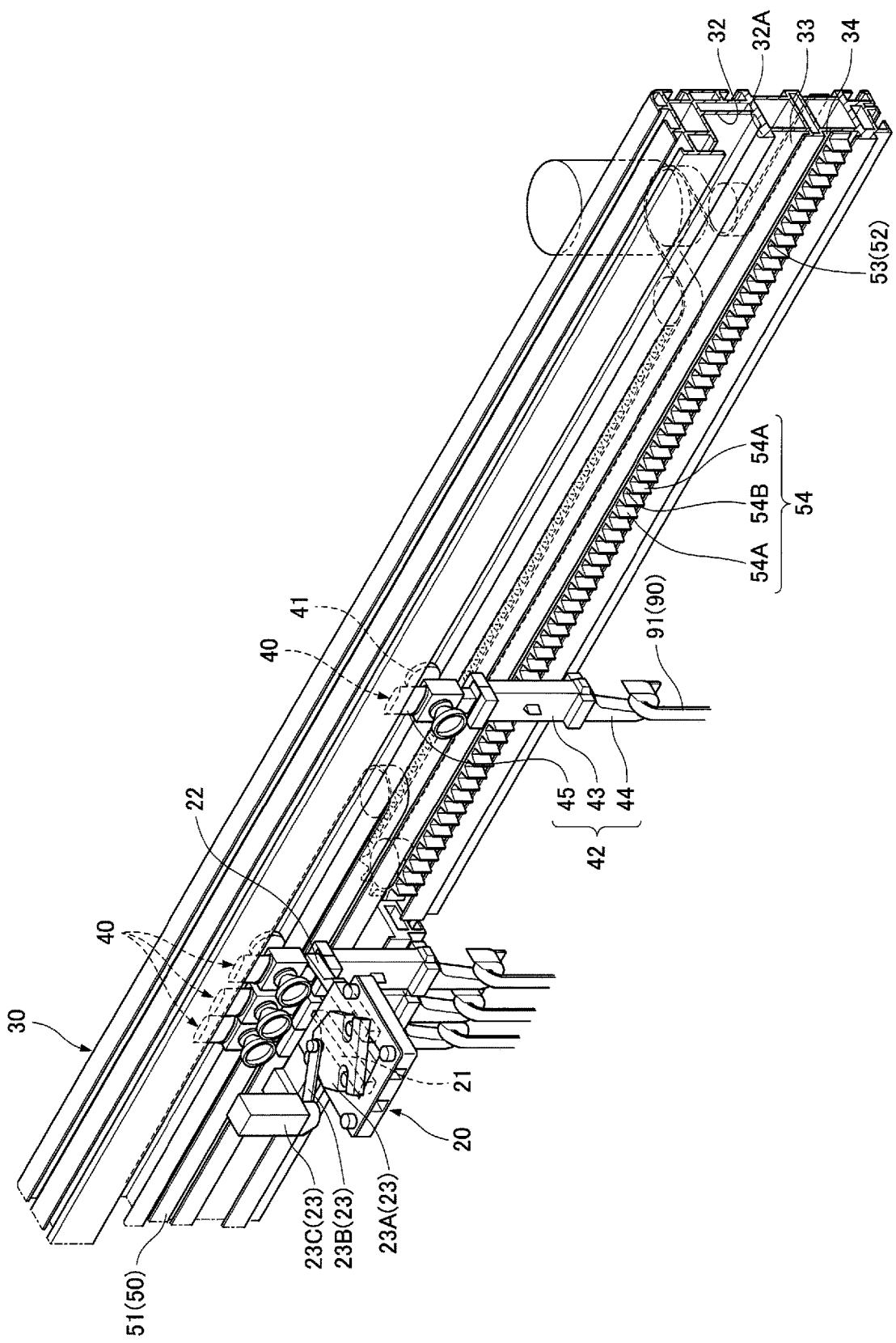
FIG. 5 is a perspective view of the traveling rail of the same conveyance facility.
Figure 6:
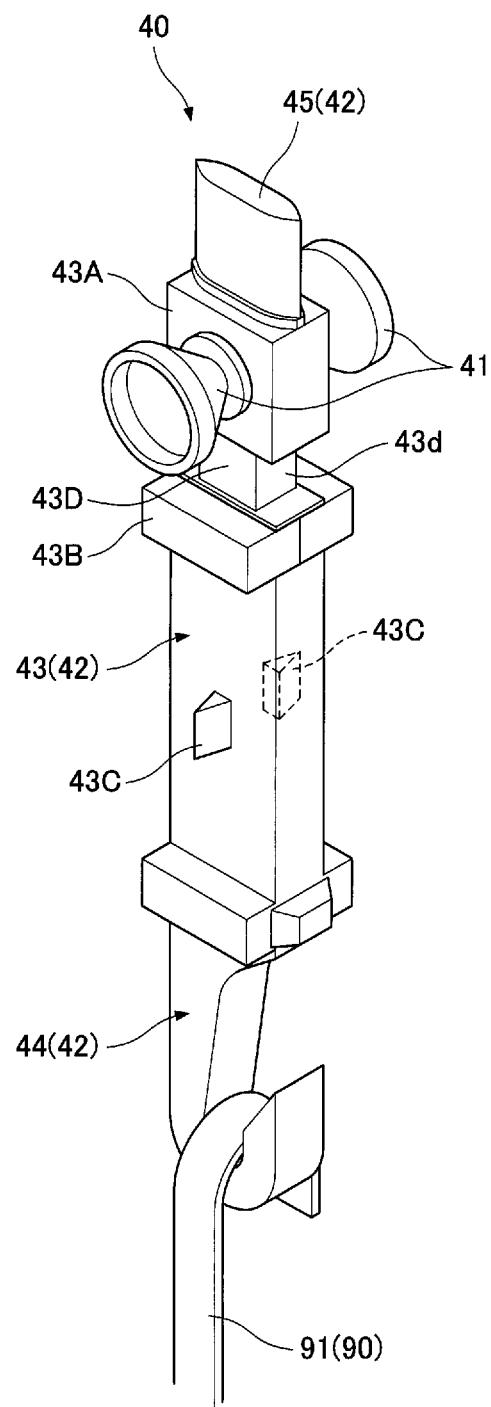
FIG. 6 is a perspective view of the carrier of the same conveyance facility.

As shown in FIGS. 1, 5 and 6, the conveyance facility 10 includes traveling rails 30 formed along the respective conveyance paths (the first path 11, the second path 12, and the detour path 13), and the carriers 40 being supported so as to be travelable by the traveling rails 30 and supporting the bags 90 being suspended.

Each of the traveling rails 30 is a frame material formed with an upper portion projecting more than a lower portion in the horizontal direction. The frame material is substantially reverse L-shaped as viewed from the side. The traveling rails 30 are extended along the respective conveyance paths (the first path 11, the second path 12, and the detour path 13). The traveling rail 30 supports a traveling wheel 41 of the carrier 40 so as to be travelable, as will be described. In the traveling rail 30, a guide groove 31 (an example of "first guide rail") guiding an upper portion of the carrier 40, a wheel support groove 32 supporting the traveling wheel 41 of the carrier 40 so as to be travelable, an upper belt groove 33 supporting an accumulation belt 50, and a lower belt groove 34 supporting a tracking conveyance belt 52 are extended in a longitudinal direction. The traveling rail 30 is formed with the guide groove 31, the wheel support groove 32, the upper belt groove 33, and the lower belt groove 34, in order from the upper portion of the frame material. According to such a configuration of the traveling rail 30, the tracking conveyance belt 52 is arranged lower than the accumulation belt 50 in the traveling rail 30. Also, the accumulation belt 50 is arranged on the side of the traveling wheel 41 of the carrier 40 supported by the traveling rail 30.

The guide groove 31 is a groove-like portion (concave portion) formed at the upper portion (portion projecting in the horizontal direction) of the traveling rail 30. The groove-like portion opens in a vertical direction. The guide groove 31 is formed at the upper portion of the traveling rail 30 so as to cover the upper portion of the traveling carrier 40. The guide groove 31 holds an upper side surface of the carrier 40 in the groove-like portion, and guides the upper portion of the carrier 40 along the respective conveyance paths (the first path 11, the second path 12, and the detour path 13).

The wheel support groove 32 is a groove-like portion (concave portion) formed at an upper side surface of the traveling rail 30. The groove-like portion opens in the horizontal direction. The wheel support groove 32 can cause the traveling wheel 41 of the carrier 40 to travel. A lower edge portion 32A of the groove-like portion of the wheel support groove 32 is formed in accordance with the shape of the traveling wheel 41. The wheel support groove 32 supports the traveling wheel 41 so as to be travelable, at the edge portion 32A.

The upper belt groove 33 is a groove-like portion (concave portion) formed at a central side surface of the traveling rail 30. The groove-like portion opens in the horizontal direction. The accumulation belt 50 can stand in the vertical direction so as to fit the upper belt groove 33. The upper belt groove 33 can cause the circular accumulation belt 50 to circle along a side surface of the traveling rail 30. The upper belt groove 33 movably supports the accumulation belt 50 along the side surface of the traveling rail 30.

The lower belt groove 34 is a groove-like portion (concave portion) formed at a lower side surface of the traveling rail 30. The groove-like portion opens in the horizontal direction. The tracking conveyance belt 52 can stand in the vertical direction so as to fit the lower belt groove 34. The lower belt groove 34 can cause the circular tracking conveyance belt 52 to circle along the side surface of the traveling rail 30. The lower belt groove 34 movably supports the tracking conveyance belt 52 along the side surface of the traveling rail 30.

Figure 7:
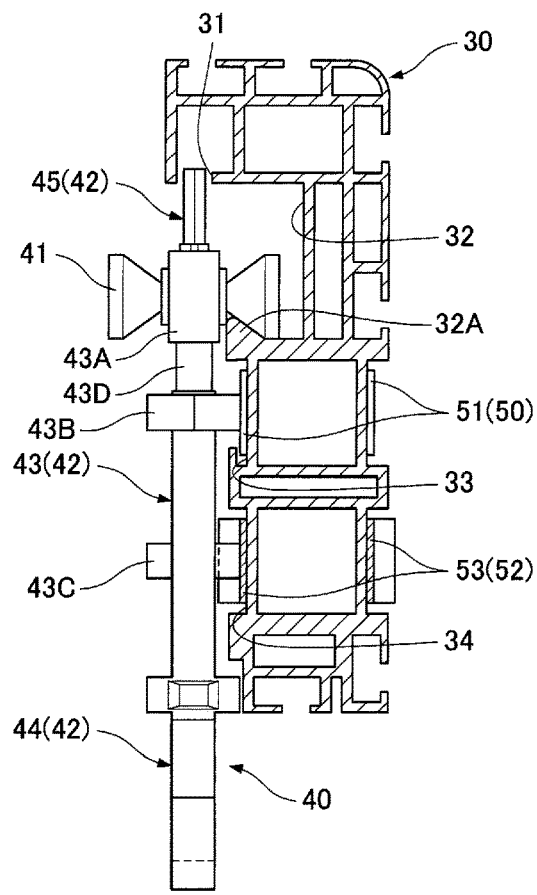
FIG. 7 is a cross-sectional view of the traveling rail of the same conveyance facility.

As shown in FIGS. 5 to 7, the carrier 40 includes the traveling wheel 41 (an example of "traveling body") supported so as to be travelable with respect to the traveling rail 30, and a support 42 supporting the bag 90 being suspended.

The traveling wheel 41 includes a pair of substantially cone-shaped wheels. The traveling wheel 41 is turnably supported by an upper portion of the support 42. In the traveling wheel 41, one wheel of the pair of wheels is placed in the wheel support groove 32 of the traveling rail 30, and is supported so as to be travelable.

The support 42 mainly includes a body portion 43 as a main body portion of the support 42, a suspension portion 44 provided at a lower portion of the body portion 43 so as to support the bag 90 being suspended, and a head portion 45

(an example of "upper portion of the support") provided at an upper portion of the body portion 43 so as to be guided by the traveling rail 30.

As shown in FIGS. 6 and 7, the body portion 43 is composed of a lengthy plate-like member. In the body portion 43, a wheel support portion 43A turnably supporting the traveling wheel 41, a contact portion 43B coming into contact with the accumulation belt 50, a meshing portion 43C being meshed with the tracking conveyance belt 52, and an engaging portion 43D engaging with the first stopper 21 and the second stopper 22 of the sending device 20 are formed.

The wheel support portion 43A is formed at the upper portion of the body portion 43. In the wheel support portion 43A, a turning shaft of the traveling wheel 41 is provided orthogonally to the horizontal direction, with respect to the traveling direction of the carrier 40 traveling in the horizontal direction.

The contact portion 43B is a block-like portion formed so as to project in the horizontal direction from both side surfaces of an upper central portion of the body portion 43. A tip end side surface of the contact portion 43B contacts with the accumulation belt 50. The contact portion 43B is formed with materials capable of friction transmission by the accumulation belt 50 (for example, rubber or the like).

Figure 8:
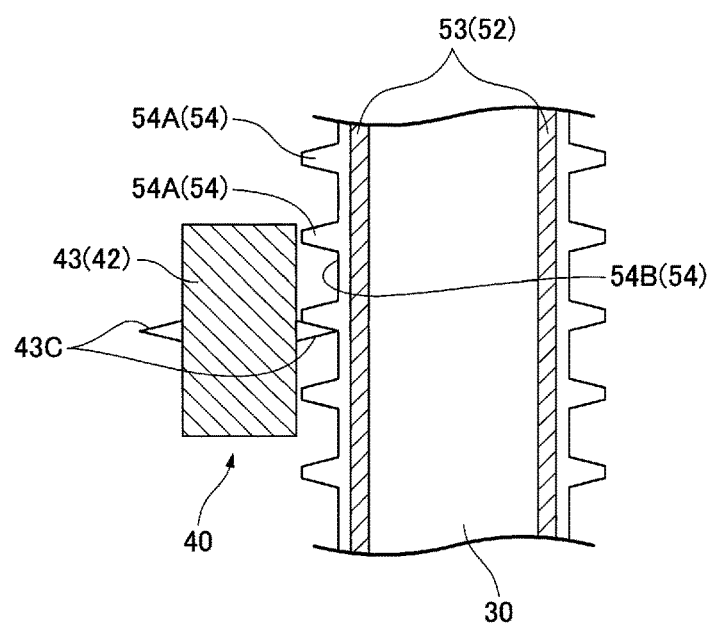
FIG. 8 is a schematic plan and cross-sectional view showing the carrier and a tracking conveyance belt of the same conveyance facility when the carrier is meshed with the tracking conveyance belt.

The meshing portion 43C is a flat plate-like convex member formed so as to project in the horizontal direction from both side surfaces of a central portion of the body portion 43. A tip end portion of the meshing portion 43C is meshed with the tracking conveyance belt 52. As shown in FIG. 8, in the meshing portion 43C, the tip end portion of the convex member is formed to be narrower than a base end portion of the convex member. The tip end portion of the convex member is also formed to be narrower than an interval between two adjacent peak portions 54A (a width of a valley portion 54B) of a concave portion 54 of the tracking conveyance belt 52, as will be described below. With this formation of the meshing portion 43C, in the meshing with the tracking conveyance belt 52, the tip end portion of the meshing portion 43C in contact with the peak portion 54A of the concave portion 54 may easily drop on the side of the valley portion 54B. Accordingly, the convex member of the meshing portion 43C may easily come into meshed contact with the valley portion MB of the concave portion 54.

As shown in FIG. 6, the engaging portion 43D is a portion formed at an upper portion side of the body portion 43, and between the wheel support portion 43A and the contact portion 43B. In the engaging portion 43D, a notch portion 43d is formed at a side portion in the traveling direction of the carrier 40. The length of the carrier 40 in the traveling direction is thereby formed to be shorter than other portions (for example, the wheel support portion 43A). The engaging portion 43D engages with the first stopper 21 and the second stopper 22 of the sending device 20 at the notch portion 43d.

As shown in FIGS. 5 and 6, the suspension portion 44 is a hook-like portion extended from the lower portion of the body portion 43. The suspension portion 44 can hook and support a hook portion 91 formed at an upper portion of the bag 90.

The head portion 45 is a flat plate-like portion extended from the upper portion of the body portion 43. The head portion 45 is guided by the guide groove 31 of the traveling rail 30. The head portion 45 is formed so that a thickness in a direction orthogonal to the horizontal direction, with respect to the traveling direction of the carrier 40 traveling in the horizontal direction, is thinner than the body portion 43. A tip end portion of the head portion 45 is inserted into the guide groove 31. Both side surfaces of the head portion 45 are then held and guided by the guide groove 31.

As shown in FIGS. 5 and 7, the carrier 40 travels on the traveling rail 30 through either frictional contact with the accumulation belt 50 (the friction transmission by the accumulation belt 50), or the meshed contact with the tracking conveyance belt 52 (meshing transmission by the tracking conveyance belt 52).

The accumulation belt 50 is a circular friction transmission belt for causing the carrier 40 to travel through the friction transmission. The accumulation belt 50 is movably provided in the upper belt groove 33 of the traveling rail 30, along the circumference of the traveling rail 30. In the accumulation belt 50, a belt 51 is formed to be flat and contactable with a side surface of the contact portion 43B of the body portion 43 of the carrier 40. The accumulation belt 50 puts the belt 51 into contact with the contact portion 43B of the carrier 40. The accumulation belt 50 causes the belt 51 in contact with the contact portion 43B to move along the upper belt groove 33 of the traveling rail 30. The carrier 40 (traveling wheel 41) is thereby caused to travel.

The tracking conveyance belt 52 is a circular meshing transmission belt for causing the carrier 40 to travel through the meshing transmission. The tracking conveyance belt 52 is movably provided in the lower belt groove 34 of the traveling rail 30, along the circumference of the traveling rail 30. The tracking conveyance belt 52 causes the meshing portion 43C of the body portion 43 of the carrier 40 to be meshed with a belt 53. The tracking conveyance belt 52 causes the belt 53 meshed with the meshing portion 43C to move along the lower belt groove 34 of the traveling rail 30. The carrier 40 (traveling wheel 41) is thereby caused to travel. In the tracking conveyance belt 52, a plurality of the concave portions 54 are formed on the belt 53 so as to be meshed with the meshing portion 43C of the carrier 40. As shown in FIGS. 5 and 8, the concave portion 54 consists of the two peak portions 54A, and the valley portion 54B linking the adjacent peak portions 54A together. For the concave portions 54, the peak portions 54A and the valley portions 54B are alternately and continuously formed along a moving direction of the tracking conveyance belt 52. The meshing portion 43C of the body portion 43 of the carrier 40 is meshed between the two peak portions 54A (with the valley portion 54B) of the concave portion 54. The tracking conveyance belt 52 is thereby put into meshed contact with the carrier 40. In other words, the meshing portion 43C of one carrier 40 is meshed with one concave portion. Thereby, the carrier 40 becomes held by the tracking conveyance belt 52. When the belt 53 moves, movement of the carrier 40 is controlled by the interval between the two peak portions 54A (the width of the valley portion 54B) of the concave portion 54.

The accumulation belt 50 and the tracking conveyance belt 52 are arranged at different positions of the traveling rail 30. Specifically, on the horizontally arranged traveling rail 30, the tracking conveyance belt 52 is arranged at a position (the lower belt groove 34) lower than a position (the upper belt groove 33) where the accumulation belt 50 is arranged. In other words, the accumulation belt 50 is arranged so as to be frictionally contactable with the carrier 40 on a side near the traveling wheel 41 (at the contact portion 43B) in the body portion 43 of the carrier 40. The tracking conveyance belt 52 is arranged to be able to be meshed with the carrier 40 on a side far from the traveling wheel 41 (at the meshing portion 43C) in the body portion 43 of the carrier 40. In such arrangements, for the frictional contact of the carrier 40 with the accumulation belt 50, the side (contact portion 43B) near the traveling wheel 41 in the carrier 40 contacts with the accumulation belt 50. For the meshing between the carrier 40 and the tracking conveyance belt 52, the side (meshing portion 43C) far from the traveling wheel 41 in the carrier 40 contacts with the tracking conveyance belt 52. Accordingly, the carrier 40 can travel at a stable position without jounce in conveyance in contact with the respective belts.

As shown in FIG. 5, the accumulation belt 50 and the tracking conveyance belt 52 are arranged at different positions from a boundary at the sending device 20 arranged on the upstream side of the branch portion 15 of the first path 11. Specifically, the accumulation belt 50 is arranged on the upstream side from a position where the sending device 20 is arranged. The tracking conveyance belt 52 is arranged on the downstream side from the position where the sending device 20 is arranged.

The travel of the carrier 40 on the first path 11 will be described. The carrier 40 travels on the first path 11 through the friction transmission by the accumulation belt 50. The carrier 40 is sent out by the sending device 20 at the predetermined intervals. The carrier 40 thereby travels on the first path 11 while keeping the predetermined intervals between the adjacent carriers 40. The traveling path of some carriers 40 of the multiple carriers 40 traveling on the first path 11 is switched to the detour path 13 by the branch unit 60. The branch unit 60 then switches the traveling path for each carrier 40. The carriers 40 thus need to be caused to travel to the branch portion 15 (branch unit 60) at the predetermined intervals kept between the adjacent carriers 40.

Accordingly, in the conveyance facility 10, the carriers 40 sent out by the sending device 20 at the predetermined intervals are caused to travel to the branch portion 15 through the meshing transmission by the tracking conveyance belt 52. The carriers 40 are thus caused to travel to the branch portion 15 at the predetermined intervals kept between the adjacent carriers 40. In other words, the carriers 40 are caused to travel on the way to the sending device 20 through the friction transmission by the accumulation belt 50. The meshing transmission by the tracking conveyance belt 52 causes the carrier 40 to travel on the downstream side from the sending device 20.

The branch portion 15 and the branch unit 60 will be described in detail.

Figure 3:
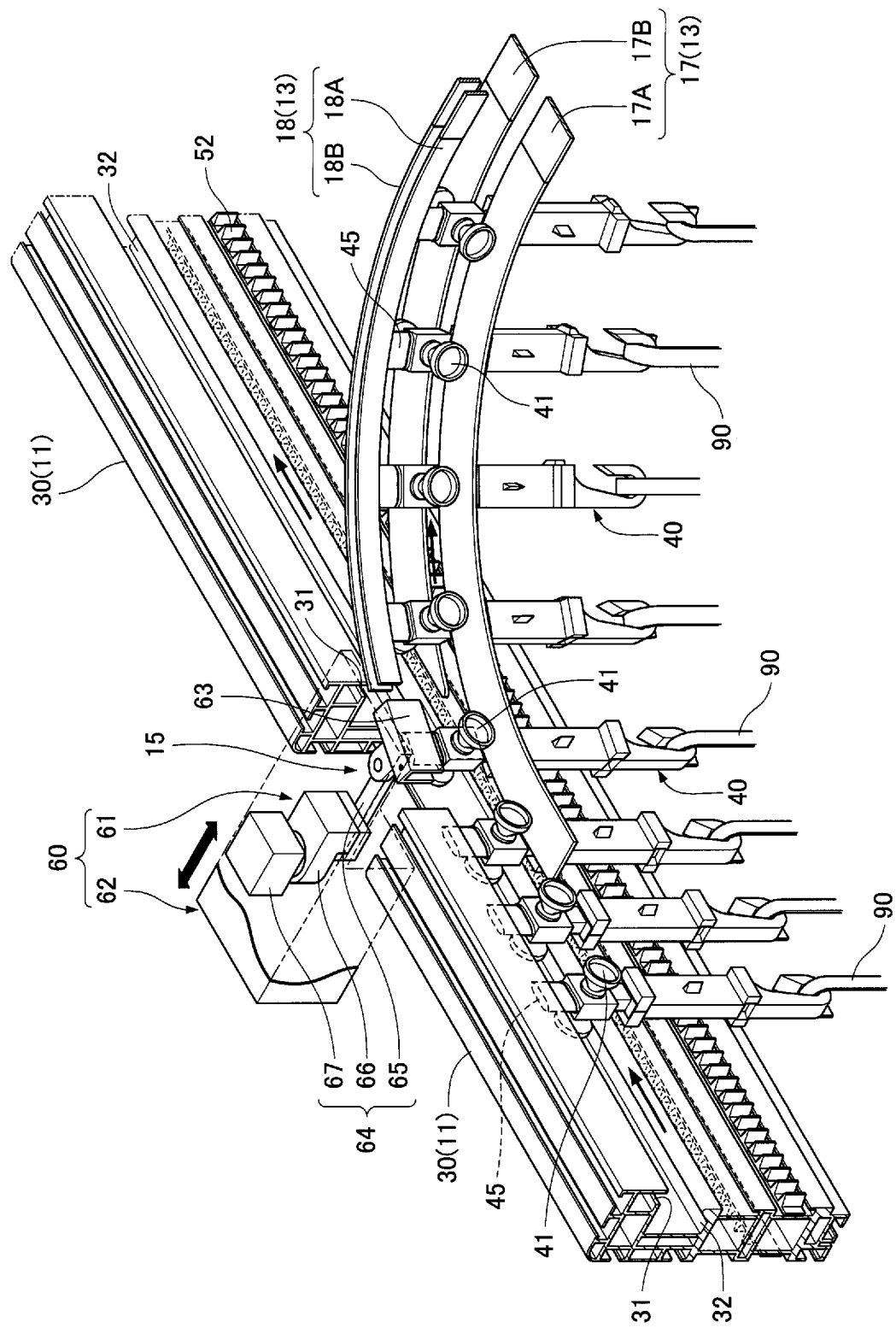
FIG. 3 is a perspective view in the vicinity of a branch device of the same conveyance facility.
Figure 4A:
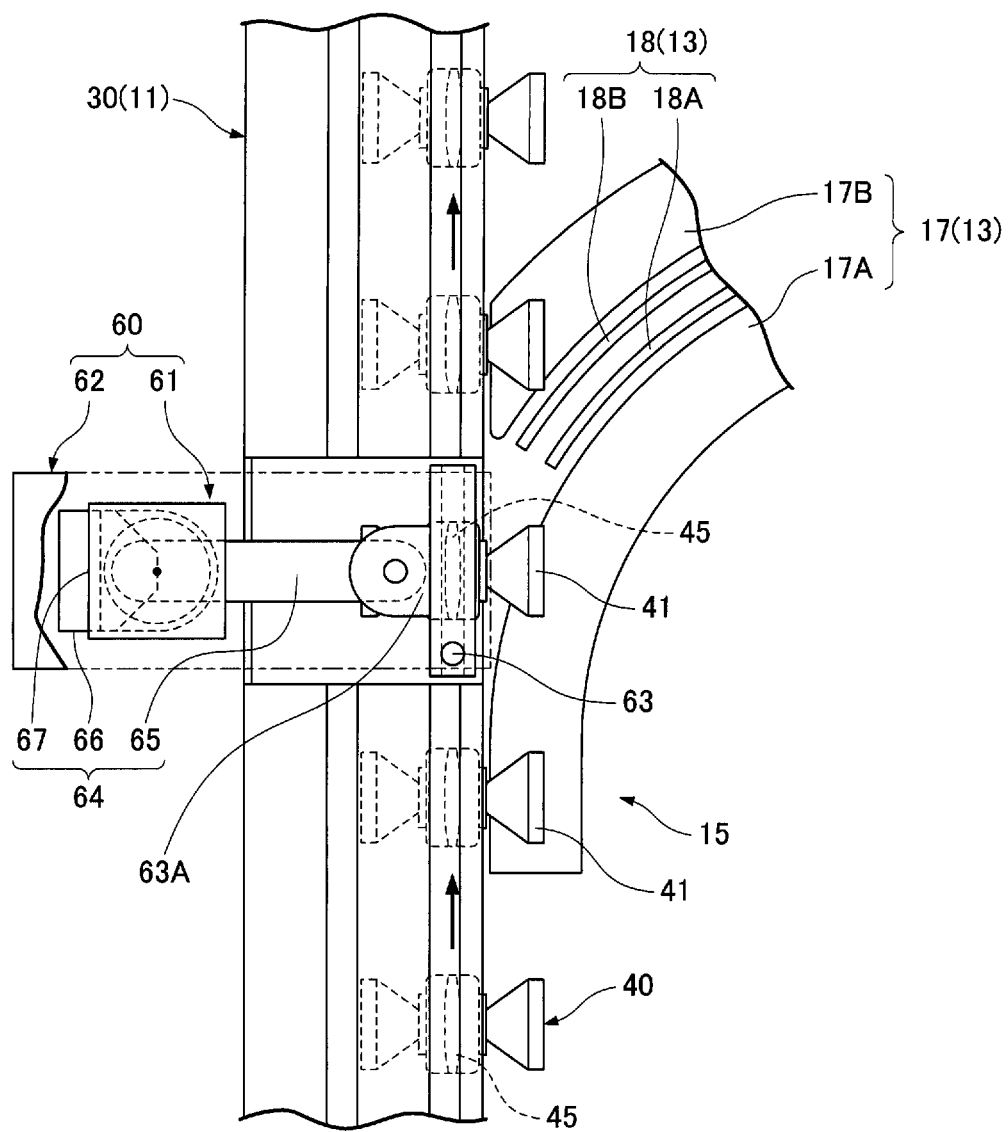
FIG. 4A is a plan view showing operations of the branch device of the same conveyance facility in a case where a conveyance path of a carrier is a first circulation path.
Figure 4B:
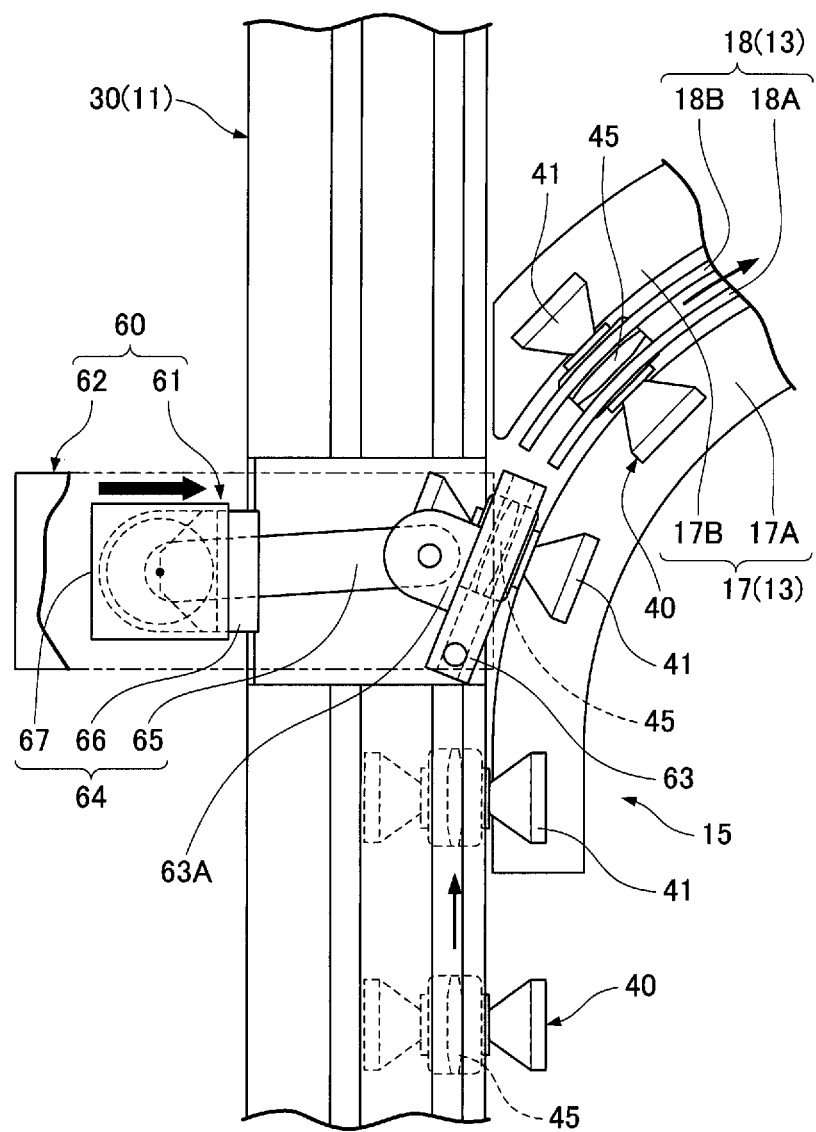
FIG. 4B is a plan view showing the operations of the branch device of the same conveyance facility in a case where the conveyance path of the carrier is a detour path.

As shown in FIGS. 3, 4A and 4B, the branch portion 15 is formed with the detour path 13 branching from a side of one side surface (a side where the carrier 40 is meshed with the tracking conveyance belt 52) of the traveling rail 30 forming the first path 11. At the branch portion 15, the branch device 61 of the branch unit 60 is actuated to thereby direct the carriers 40 traveling on the traveling rail 30 of the first path 11, to the beginning portion of the detour path 13.

At the beginning portion of the detour path 13, a branch rail 17 guiding the traveling wheel 41 of the carrier 40 directed from the first path 11; and an upper portion guide 18 (an example of "second guide rail") guiding the head portion 45 of the support 42 of the carrier 40 are provided.

The branch rail 17 includes an inner peripheral side rail 17A and an outer peripheral side rail 17B. The inner peripheral side rail 17A and the outer peripheral side rail 17B are formed with curved plates. Planar portions of the inner peripheral side rail 17A and the outer peripheral side rail 17B are arranged in a substantially horizontal direction so that the traveling wheel 41 of the carrier 40 can be placed thereon. The branch rail 17 has a structure for holding and guiding both of the traveling wheels 41 of the carrier 40. In the branch rail 17, the inner peripheral side rail 17A and the outer peripheral side rail 17B are arranged parallel to each other in a right-left direction with respect to the traveling direction of the carrier 40, so as to hold the body portion 43 of the carrier 40 therebetween.

The outer peripheral side rail 17B is arranged so as to be continuous with the wheel support groove 32 of the traveling rail 30 forming the detour path 13. Thereby, the outer peripheral side rail 17B guides the traveling wheel 41 guided by the wheel support groove 32 of the traveling rail 30 forming the first path 11, to the wheel support groove 32 of the traveling rail 30 forming the detour path 13.

The upper portion guide 18 includes an inner peripheral side guide portion 18A and an outer peripheral side guide portion 18B. The inner peripheral side guide portion 18A and the outer peripheral side guide portion 18B are formed with curved plate materials. The inner peripheral side guide portion 18A and the outer peripheral side guide portion 18B are caused to stand in the vertical direction. In the upper portion guide 18, the inner peripheral side guide portion 18A and the outer peripheral side guide portion 18B are arranged to face each other so as to keep an interval where the head portion 45 of the carrier 40 can travel. The upper portion guide 18 is arranged so as to be continuous with the guide groove 31 of the traveling rail 30 forming the detour path 13.

The branch unit 60 is provided at a beginning portion of the upper portion guide 18. The branch unit 60 is provided in a space formed at a portion of the traveling rail 30 forming the first path 11, at the branch portion 15. The branch unit 60 includes the branch device 61, and an enclosure 62 supporting the branch device 61.

The branch device 61 mainly includes a guide member 63 guiding the head portion 45 of the carrier 40, and a towing device 64 (an example of "towing portion") towing the guide member 63.

The guide member 63 is composed of a lengthy concave member. In the guide member 63, a concave guide portion guiding the head portion 45 of the carrier 40 is arranged downward. The guide member 63 guides the carrier 40 at the concave guide portion so that the head portion 45 of the carrier 40 is covered from above. In other words, in the guide member 63, the concave guide portion is formed with a concave depth depending on the head portion 45 of the carrier 40. One end portion (end portion for accepting the carrier 40) of the guide member 63 is supported turnably with respect to the enclosure 62. The guide member 63 has a connecting portion 63A (see FIGS. 4A and 4B) for connecting with an arm portion 65 of the towing device 64, on one side portion of the guide member 63.

The towing device 64 mainly includes the arm portion 65 towing the guide member 63; a cam portion 66 driving the arm portion 65; and a motor 67 driving the cam portion 66.

The arm portion 65 can move in the horizontal direction through cam drive by the motor 67. One end portion of the arm portion 65 is connected to the cam portion 66. The other end portion of the arm portion 65 is turnably connected to the connecting portion 63A of the guide member 63.

The cam portion 66 can be driven by the motor 67 so as to turn. The cam portion 66 turns with the motor 67 to thereby move the arm portion 65 in the horizontal direction.

The motor 67 is supported by the enclosure 62. The motor 67 turnably supports the cam portion 66.

In the space formed by cutting a portion of the traveling rail 30 forming the first path 11, the enclosure 62 is arranged above the traveling rail 30 forming the first path 11.

Operations of the branch device 61 will be described.

As shown in FIGS. 4A and 4B, the branch device 61 switches a guide direction of the support 42 by the guide member 63, and thereby switches a conveyance direction of the carrier 40.

As shown in FIG. 4A, if the carrier 40 is conveyed along the first path 11, the branch device 61 holds the guide member 63 in a direction coaxial to the traveling rail 30 forming the first path 11. Specifically, the branch device 61 holds the guide member 63 so that the concave guide portion of the guide member 63 and the guide groove 31 of the traveling rail 30 forming the first path 11 communicate with each other. Thereby, the head portion 45 of the support 42 of the carrier 40 guided along the guide groove 31 of the traveling rail 30 from the upstream side of the first path 11 is guided along the concave guide portion of the guide member 63. The head portion 45 of the support 42 of the carrier 40 is continuously guided to the guide groove 31 of the first path 11 (traveling rail 30) on the downstream side.

As shown in FIG. 4B, if the conveyance path of the carrier 40 is switched from the first path 11 to the detour path 13, the branch device 61 holds the guide member 63 at a predetermined angle with respect to the traveling rail 30 forming the first path 11. Specifically, the branch device 61 causes the arm portion 65 of the towing device 64 to move horizontally. The branch device 61 thereby tows the guide member 63 in a direction orthogonal to the horizontal direction, with respect to the traveling rail 30 forming the first path 11. Thereby, the other end portion (end portion for passing the carrier 40 to the upper portion guide 18) of the guide member 63 turns toward the beginning portion of the upper portion guide 18. Then, the concave guide portion of the guide member 63 and the upper portion guide 18 communicate with each other. The head portion 45 of the support 42 of the carrier 40 guided along the guide groove 31 of the traveling rail 30 from the upstream side of the first path 11 is guided along the concave guide portion of the guide member 63. The support 42 is thereby directed from the first path 11 to the upper portion guide 18 (detour path 13).

In this way, the branch unit 60 supports and guides the head portion 45 of the support 42 of the carrier 40, by the guide member 63, and thereby switches the conveyance path of the carrier 40 from the first path 11 to the detour path 13.

The branch unit 60 switches the guide direction of the support 42 by the guide member 63, from a direction where the first path 11 is extended (direction where the guide groove 31 of the traveling rail 30 is extended), to a direction where the upper portion guide 18 is extended. The branch unit 60 thereby switches the conveyance path of the carrier 40 from the first path 11 to the detour path 13.

The branch unit 60 tows the guide member 63 guiding the support 42, by the towing device 64, and thereby switches the guide direction of the support 42 by the guide member 63.

As has been described, according to the present embodiment, the branch device 61 for switching the conveyance path of the carrier 40 can direct the support 42 of the carrier 40 from the first path 11 to the detour path 13. Thereby, the carrier 40 can be caused to travel from the first path 11 toward the second path 12 while the support 42 of the carrier 40 is directed from the first path 11 to the second path 12 by the branch device 61. Accordingly, when the carrier 40 travels from the first path 11 toward the second path 12, the conveyance path of the carrier 40 can be reliably switched at the branch portion 15 without bouncing up of the carrier 40.

In the present embodiment, the support 42 is directed from the first path 11 to the detour path 13 while the support 42 is supported by the guide member 63 having the concave guide portion. This configuration is, however, not limited thereto. As long as the support 42 can be directed from the first path 11 to the detour path 13 (upper portion guide 18), for example, the support 42 may be directed from the first path 11 to the detour path 13 simply by pressing a side portion of the support 42, without supporting the support 42.

In the present embodiment, the guide member 63 guides the head portion 45 of the support 42, so as to direct the support 42 from the first path 11 to the detour path 13. This configuration is, however, not limited thereto. As long as the support 42 can be directed from the first path 11 to the detour path 13 (upper portion guide 18), for example, the guide member 63 may guide the body portion 43 of the support 42.

In the present embodiment, the guide member 63 is towed by the towing device 64 so as to switch the guide direction of the support 42 by the guide member 63. This configuration is, however, not limited thereto. As long as the guide member 63 is turnable in a predetermined direction, for example, a turning shaft turnably supporting the guide member 63 may be directly turned by a drive source such as a motor.

In the present embodiment, the guide member 63 is composed of the concave member. The guide member 63 is, however, not limited thereto, and may be composed of two flat plates standing parallel to each other in the vertical direction, for example, as long as the support 42 can be supported and guided.

Figure 9:
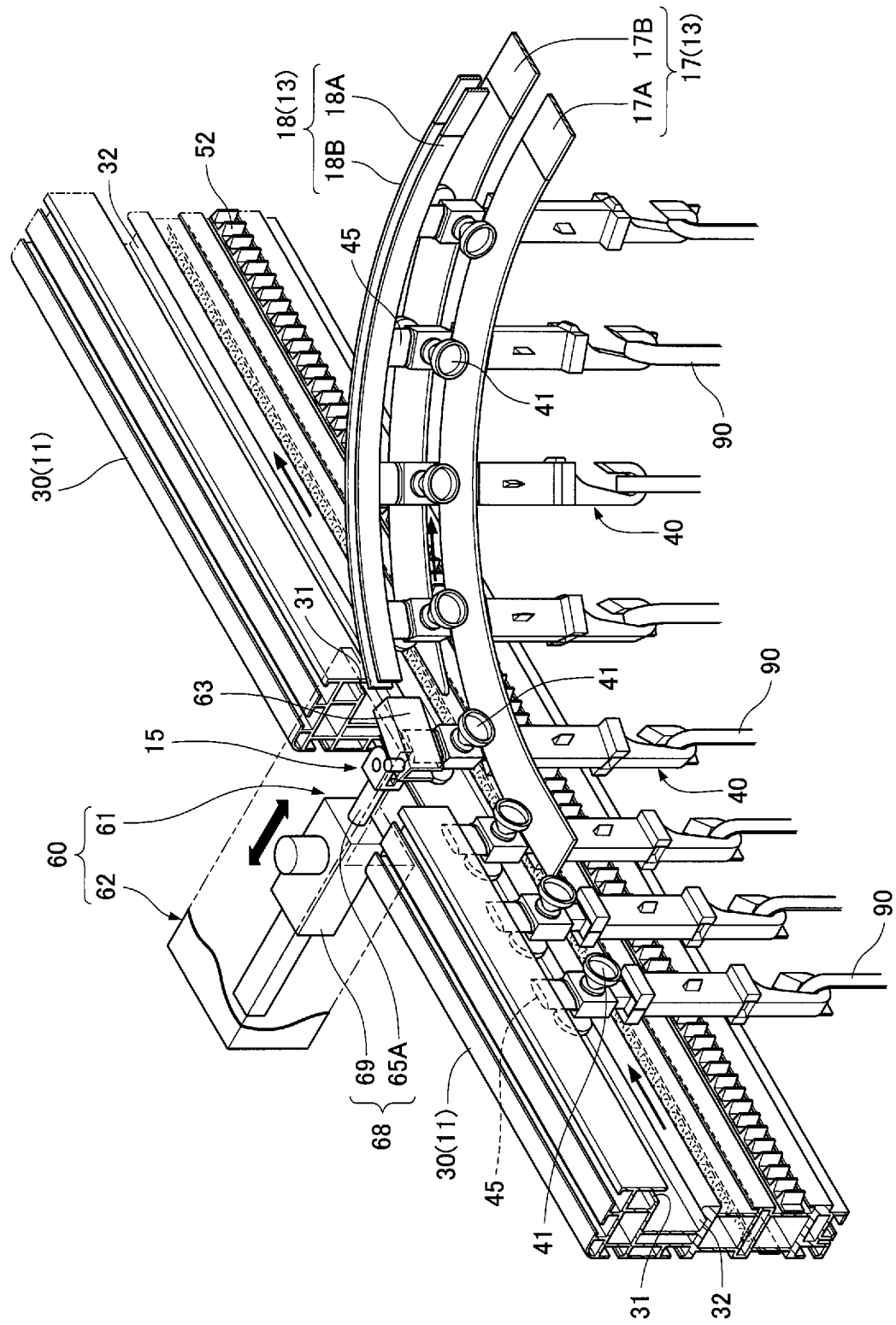
FIG. 9 is a perspective view in the vicinity of a branch device according to another example of the same conveyance facility.
Figure 10A:
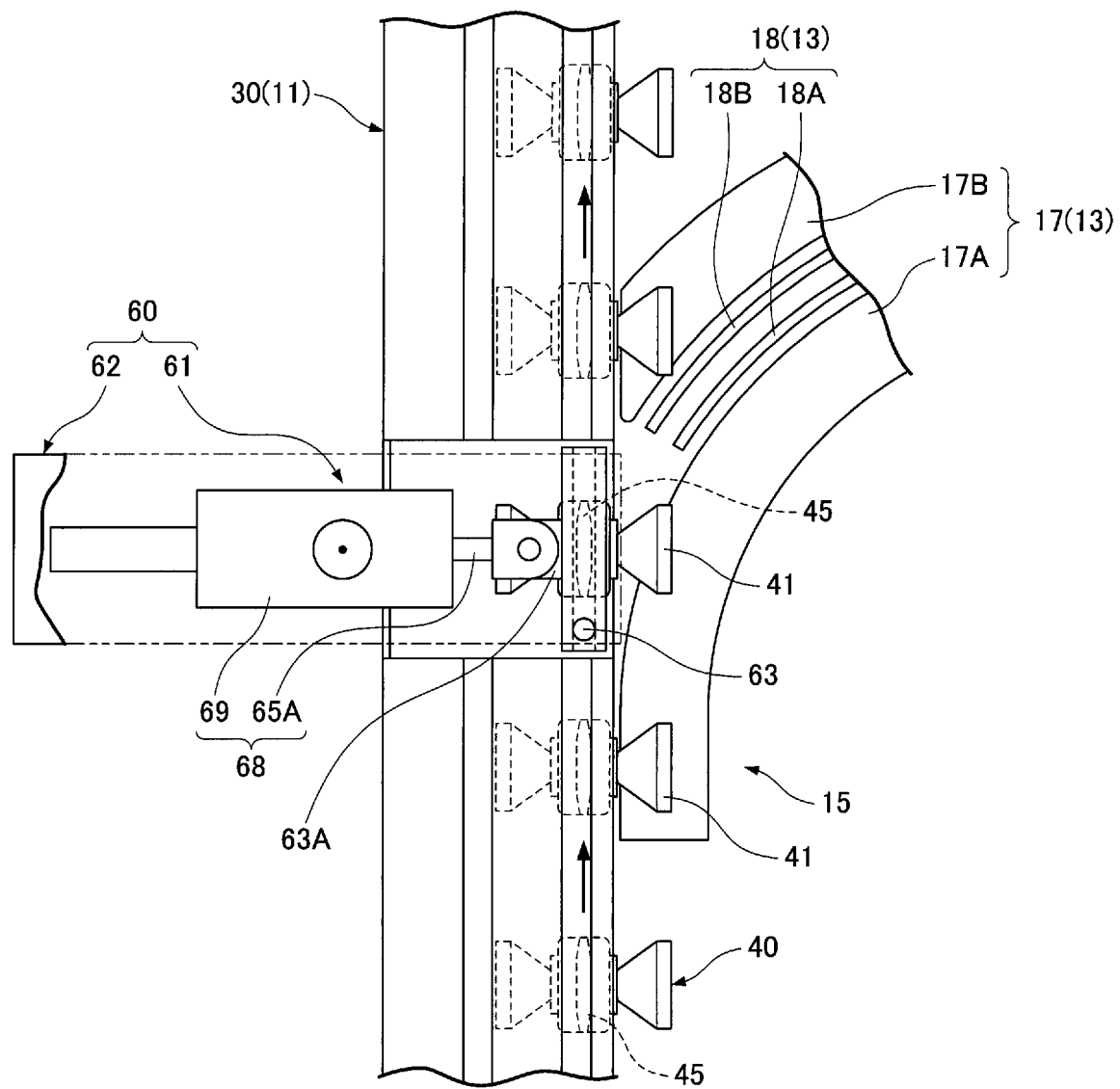
FIG. 10A is a plan view showing operations of a branch device according to the other example of the same conveyance facility in a case where a conveyance path of a carrier is a first circulation path.
Figure 10B:
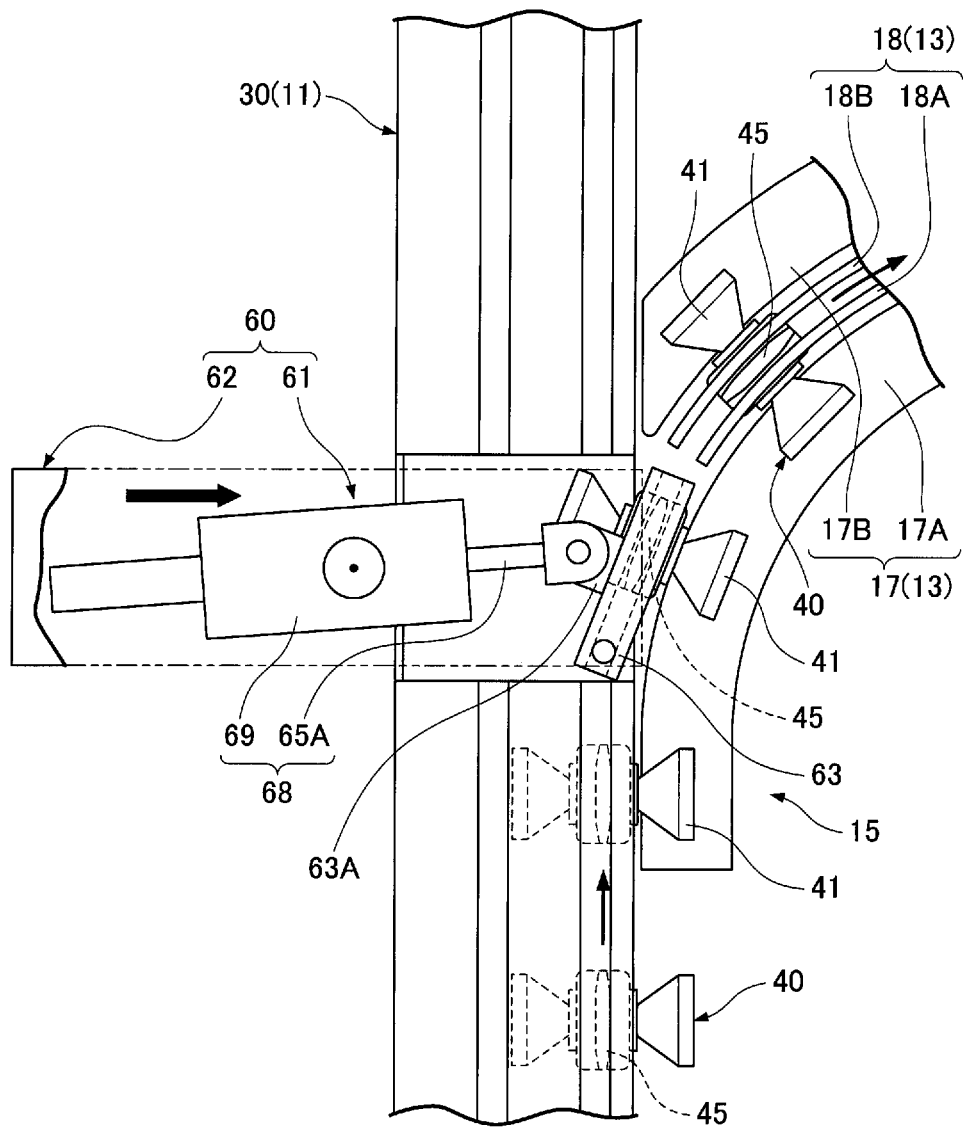
FIG. 10B is a plan view showing the operations of the branch device according to the other example of the same conveyance facility in a case where the conveyance path of the carrier is a detour path.

In the present invention, as shown in FIGS. 9, 10A and 10B, an electric actuator 68 may mainly include an arm portion 65A towing the guide member 63; and a main body portion 69 causing the arm portion 65A to perform expansion and contraction movement. The electric actuator 68 may be employed as the towing device 64 of the branch device 61. The arm portion 65A can perform the expansion and contraction movement in the horizontal direction with respect to the main body portion 69. In addition, a tip end of the arm portion 65A is turnably connected to the connecting portion 63A of the guide member 63. The main body portion 69 is supported turnably with respect to the enclosure 62, and movably supports the arm portion 65A. The main body portion 69 includes a not-shown motor for moving the arm portion 65A. The motor is driven to cause the arm portion 65A to perform the expansion and contraction movement.

What is claimed is:

1. A conveyance facility for conveying an article along a conveyance path, comprising:
    a conveyance unit comprising a traveling body traveling on the conveyance path, and a support traveling with the traveling body and supporting the article being suspended, the conveyance unit conveying the article along the conveyance path; and
    a traveling rail supporting the traveling body so as to be travelable,
    wherein the traveling rail forms a first conveyance path, and a second conveyance path branching from a location in a middle of the first conveyance path,
    wherein a switching device for switching the conveyance path of the conveyance unit from the first conveyance path to the second conveyance path is provided at a branch portion between the first conveyance path and the second conveyance path, and
    wherein the switching device is capable of directing the support from the first conveyance path to the second conveyance path, wherein the switching device includes
- a turnably supported guide member having a non-curved elongated guide portion configured to guide the conveyance unit along a path of the non-curved elongated guide portion, the guide member selectively turnable to one of a first angular position corresponding to the first conveyance path and a second angular position corresponding to the second conveyance path,
- wherein when in the first angular position the non-curved elongated guide portion guides the conveyance unit along the first conveyance path, and when in the second angular position the non-curved elongated guide portion guides the conveyance unit along the second conveyance path.

2. The conveyance facility according to claim 1, wherein the traveling rail comprises a first guide rail guiding an upper portion of the support along the first conveyance path, and a second guide rail guiding the upper portion of the support along the second conveyance path; and wherein the guide member supports and guides the upper portion of the support, and is capable of switching the direction of guiding the support, from the first guide rail to the second guide rail.

3. The conveyance facility according to claim 2, wherein the switching device comprises a towing portion towing the guide member; and wherein the guide member is capable of switching a traveling direction of the support, through the towing by the towing portion.

4. The conveyance facility according to claim 1, wherein the switching device comprises a towing portion towing the guide member; and wherein the guide member is capable of switching a traveling direction of the support, through the towing by the towing portion.

5. The conveyance facility according to claim 1, further comprising an actuator coupled to the guide member and configured to selectively orient the guide member to one of the first angular position and the second angular position.

6. The conveyance facility according to claim 5, wherein the actuator comprises an arm portion turningly connected to the guide member, and a cam portion drivingly coupled to the arm portion, wherein movement of the cam portion effects motion of the arm portion and moves the guide member between the first angular position and the second angular position.

7. The conveyance facility according to claim 1, wherein the guide member comprises a concave portion having two parallel side walls that define the non-curved elongated guide portion.

* * * * *